United States Patent [19]

Shiga et al.

[11] Patent Number: 4,576,469

[45] Date of Patent: Mar. 18, 1986

[54] SENSITIVE MATERIAL CUTTING AND TRANSPORTING MECHANISM

[75] Inventors: Koji Shiga; Tatsunari Arito, both of Kanagawa, Japan

[73] Assignees: Fuji Photo Film Co., Ltd.; Fuji Micro Graphics Co., Ltd., both of Kanagawa, Japan

[21] Appl. No.: 573,755

[22] Filed: Jan. 25, 1984

[30] Foreign Application Priority Data

Jan. 25, 1983 [JP] Japan .................................. 58-10236

[51] Int. Cl.⁴ .............................................. G03B 29/00
[52] U.S. Cl. ........................................... 355/29; 355/54
[58] Field of Search ...................... 355/28, 29, 53, 54

[56] References Cited

U.S. PATENT DOCUMENTS

| 3,674,367 | 7/1972 | Chapman | 355/29 X |
| 3,746,444 | 7/1973 | Kahle et al. | 355/54 X |
| 4,035,074 | 7/1977 | Flor | 355/53 X |
| 4,247,197 | 1/1981 | Oosaka et al. | 355/54 |
| 4,417,808 | 11/1983 | Kogane | 355/29 |
| 4,444,485 | 4/1984 | Kogane | 355/29 |

Primary Examiner—Richard A. Wintercorn
Attorney, Agent, or Firm—Sughrue, Mion, Zinn, Macpeak and Seas

[57] ABSTRACT

A mechanism for cutting film supplied in the form of a long strip into segments having a predetermined length and transporting the segments to a subsequent processing stages wherein cutting, positioning and holding of the film are performed substantially simultaneously with an apparatus having a simple construction. A film suction platen is provided having a plurality of holes formed therein. A lowered pressure is provided on the side of the platen opposite that on which film segments of a predetermined length are fed from a supply reel. A cutting mechanism is mounted alongside the platen to cut the segments after they have been fed. After the segments have been cut, and following exposure while on the film suction platen, the film suction platen is reciprocated to a take-out section which extracts the exposed film segments from the surface of the film suction platen and feeds them to the processing stage.

7 Claims, 4 Drawing Figures

SENSITIVE MATERIAL CUTTING AND TRANSPORTING MECHANISM

BACKGROUND OF THE INVENTION

The present invention relates to a sensitive material transporting mechanism. More particularly, the invention relates to a sensitive material transporting mechanism for cutting a sensitive material, such as photosensitive film, supplied in the form of a long strip into predetermined lengths and for transporting the cut pieces to a next stage.

In a microfiche camera, for instance, roll film in the form of a long strip is cut into predetermined lengths and photographing is performed using the thus-obtained film segments (fiches).

In such a conventional camera of this kind, however, there has been a problem that the structure of a film transporting mechanism is complicated and the transporting time is lengthy because the fiche must be held by a suction device after it has been transported to and accurately positioned at a photographing position.

Accordingly, a primary object of the invention is to provide a sensitive material transporting mechanism in which the above-mentioned problem of the conventional sensitive material transporting mechanism is solved and the cutting, positioning and holding of fed sensitive material in the form of a long strip can be performed simultaneously with a simple structure.

SUMMARY OF THE INVENTION

The above-mentioned object of the present invention is attained by a sensitive material transporting mechanism for cutting a sensitive material supplied in the form of a long strip into predetermined lengths and transporting the cut pieces to the next stage, characterized in that there is provided suction/transporting means movably supported to reciprocate between a position at which the sensitive material is cut and another position at which a cut piece of the sensitive material is delivered to the next stage, whereby a predetermined length of sensitive material is held by the suction/transporting means and placed at the sensitive material cutting position, and then cut and transported by the suction/transporting means.

DESCRIPTION OF THE PREFERRED EMBODIMENTS

Figure 1:
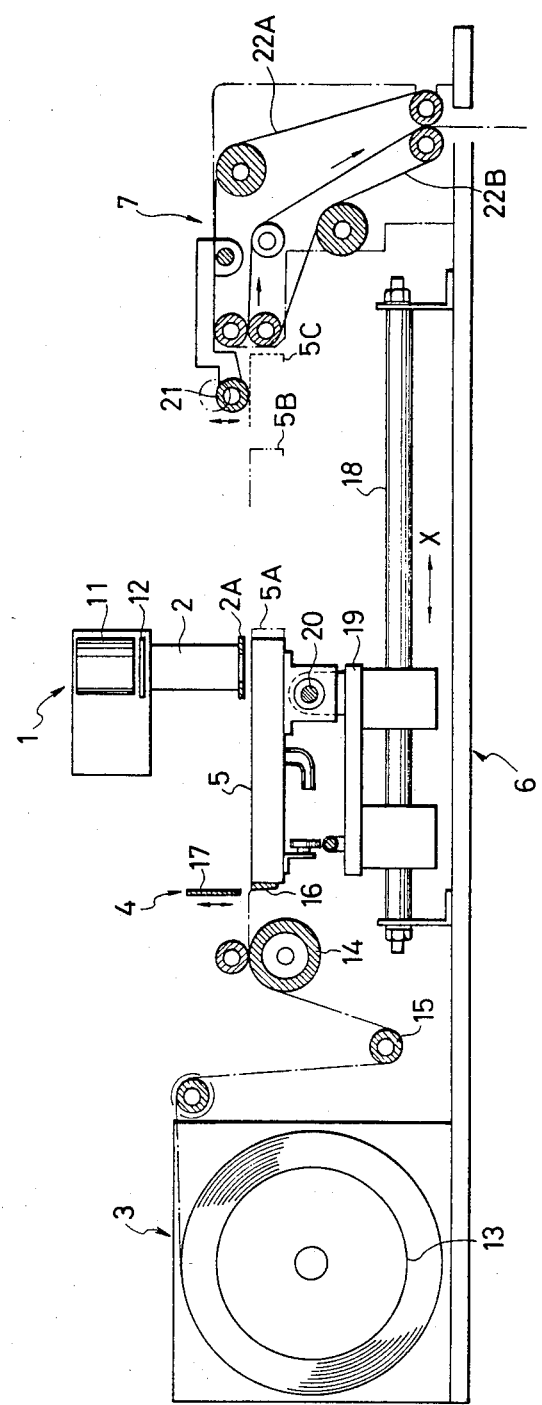
FIG. 1 is a front view of a sensitive material transporting mechanism of the present invention.

Referring to the drawings, a preferred embodiment of a transporting mechanism the present invention will be described in detail.

FIG. 1 is a front view showing a film transporting mechanism for a microfiche camera constructed in accordance with the present invention. In the drawing, reference numeral 1 represents a camera section which is provided with an objective lens 11, a shutter 12, a shutter control mechanism, etc; 2 represents an optical path housing which is provided with a film gate 2A; 3 represents a film feeding section which is provided with a film reel 13, a film feeding roller 14 and a guide roller 15; and 4 represents a cutter section which is provided with an upper blade (movable blade) 17 opposing a lower blade (fixed cutting edge) 16 disposed in the same plane as a film attraction platen 5, which will be described later, and a link mechanism for causing the upper blade to move vertically. The film suction platen 5 is provided with a number of air inlet holes in its upper surface (see FIG. 2). Reference numeral 6 represents a film suction platen moving mechanism for moving the film suction platen 5 in the X and Y directions in a horizontal plane (the X direction being indicated in the drawing and the Y direction being perpendicular to the plane of the drawing), and 7 represents a film take-out section for transporting film which has been exposed from the film suction platen 5 to a processing section in the next stage.

The film suction platen moving mechanism 6 is arranged to support the film suction platen 5 such that the film suction platen 5 can be reciprocated along a guide rod 20, extending in the Y direction, on a carriage 19, which is reciprocatable in the X direction along a guide rod 18 between a first position at which the film suction platen 5 is in contact with the cutter section 4 (as indicated by a solid line in the drawing) and a second position at which it is almost in contact with the film take-out section 7 (as indicated by a broken line in the drawing). Further, respective third and fourth positions are indicated in the drawing by a one-dot chain line and a two-dot chain line, respectively, which positions 5A and 5B are within the range of movement for photographing a plurality of images in the X direction of the film suction platen 5.

The first position at which the film suction platen 5 comes into contact with the cutter section 4 is a position at which the film suction platen 5 is positioned to receive film from the film feeding section 3 prior to exposure, and the second position 5C at which the film suction platen 5 comes into almost contact with the film take-out section 7 is a position to which the film suction platen 5 is moved when exposed film is to be transported to the processing section to be processed. The reason why the film suction platen 5 is arranged to be movable in both X and Y directions is to make it possible to perform exposure to form plural picture images in a two-dimensional array. For controlling the position of the film suction platen 5, separate driving systems for X and Y directions can be provided and a pulse motor is used as a drive source therefor. In that case, the film suction platen 5 can be moved through a desired distance from a reference point by supplying the pulse motor with a predetermined number of pulses corresponding to the designated photographing position.

The film feeding section 3 pulls out the film from the film reel 13 by a predetermined length using the film feeding roller 14 and sends the extracted film on to the film suction platen 5. The amount of film fed is controlled by controlling the rotational angles of the roller 14.

The film take-out section 7 is constituted by a pickup roller 21, which can be selectively moved into contact with and separated from the surface of the film on the film suction platen 5, and a pair of film transporting belts 22A and 22B. The function of these belts is to cause the pickup roller 21 to extract the film from the film suction platen 5 and to cause the pair of transporting belts 22A and 22B to sandwich the extracted film therebetween.

The operation of the thus-arranged device of this embodiment of the invention will now be described.

Figure 2:
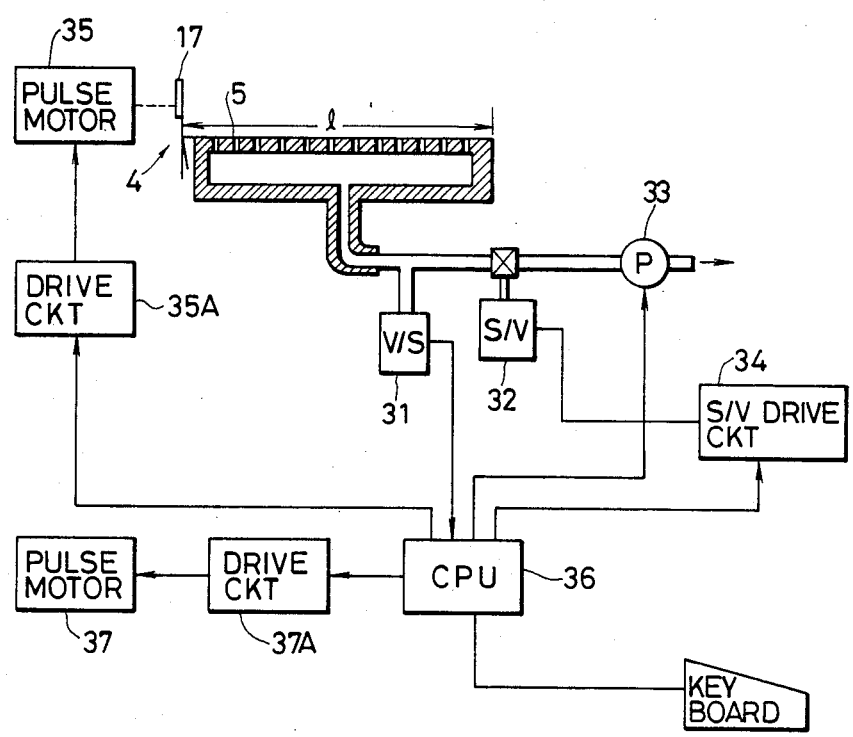
FIG. 2 is a functional block diagram showing main parts of the operating structure of the mechanism of FIG. 1.
Figure 3:
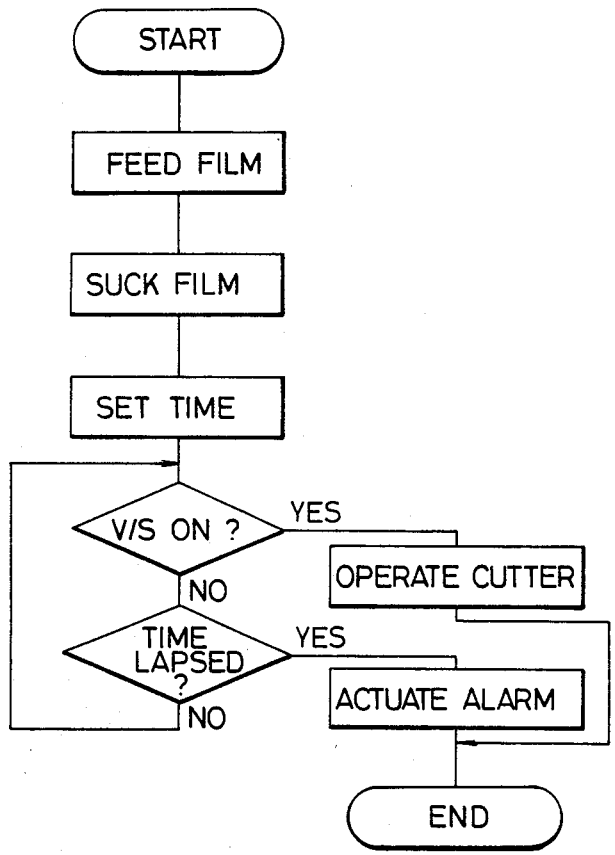
FIG. 3 is a flowchart describing the operations of the structure of FIG. 2.

FIG. 2 is a functional block diagram showing components used for film feeding, positioning, suction and cutting operations, and FIG. 3 is a flowchart describing the operations of these components. In FIG. 2, reference numeral 5 designates the above-mentioned film suction platen. A vacuum pump 33 is connected to the film suction platen 5 through a solenoid valve (S/V) 32. A vacuum sensor (V/S) 31, the output of which is applied to a microcomputer (CPU) 36, senses the pressure produced by the vacuum pump 33. A solenoid valve drive circuit 34, a cutter-drive pulse motor 35 and a film-feeding pulse motor 37 are controlled by the CPU 36 in the following manner:

(1) Film Feeding

The CPU 36 supplies a signal to a drive circuit 37A to cause it to produce pulses in a number corresponding to the predetermined film length to drive the film-feeding pulse motor 37 to feed film in the predetermined length onto the film suction platen 5. The film suction platen 5 is provided with a guide structure along the film transporting direction with which the fed-out film is correctly positioned. The fed-out length of the film 1 is indicated in the drawing.

(2) Film Suction

The CPU 36 starts the vacuum pump 33 at the same time as the initiation of feeding the film, and also opens the solenoid valve 32 to reduce the pressure in the film suction plate 5 upon the completion of feeding the film. At the same time, the film suction monitoring time is set.

(3) Film Cutting

If an output is produced by the vacuum sensor 31 within the above-mentioned suction monitoring time, the CPU 36 causes the drive circuit 35A to actuate the cutter section 4 to cut the film at the position at which the film has been sucked.

(4) Abnormal Case

Upon the elapse of the suction monitoring time with no output produced by the vacuum sensor 31, the CPU 36 actuates an alarm device (not shown) to indicate to the operator the fact that an abnormality has occurred.

Through the processing as mentioned above, a length 1 of film is set onto the film suction platen 5. Therefore, the film suction platen 5 is moved to a predetermined photographing position to perform an exposure operation using the camera section 1. The exposed film is delivered from the film suction platen 5 to the film takeout section 7 and then subjected to processing.

Figure 4:
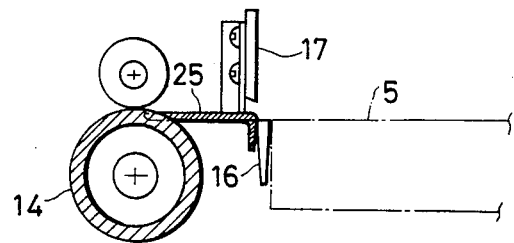
FIG. 4 is a detailed diagram of a cutter section used in the mechanism of FIG. 1.

If a guide provided at the outlet side of the film feeding roller 14 of the film feeding section 3 is arranged to be movable, the film feeding can be performed smoothly. More specifically, it is preferred that a film guide 25, arranged as shown in FIG. 4 and engaged in a comb-like manner with the film feeding roller 14, be engaged with the upper blade 17 of the cutter section 4 so as to be linked with the upper blade 17. In this manner, when the upper blade is lifted up, that is, during film feeding or standing by for film feeding, the upper surface of the guide 25 is slightly higher than the lower blade 16 and the upper surface of the film suction platen 5 so that the film can be fed out smoothly. In the next step where the film is sucked, the upper blade 17 is lowered somewhat to make the guide 25 slightly lower than the lower blade 16 so that the film can be sucked smoothly without air leakage.

Although it has been described that the vacuum pump is started at the same time as the initiation of film feeding and the solenoid valve is opened upon the completion of film feeding to actuate the cutter with a signal produced by the vacuum sensor, these timings may be changed and the present invention is not limited to the above-mentioned embodiment.

As described above, according to the present invention, a sensitive material transporting mechanism for cutting a sensitive material supplied in the form of a long strip into predetermined lengths and transporting the cut pieces to a next stage is characterized in that there is provided suction/transporting means movably supported to reciprocate between a position at which the sensitive material is cut and a position at which the cut piece of the sensitive material is delivered to the next stage. A predetermined length of the sensitive material is fed and sucked by the suction/transporting means placed at the sensitive material cutting position. The sensitive material is then cut and transported by the suction/transporting means. Accordingly, with the invention it is made possible to substantially simultaneously perform the cutting, positioning and holding of the sensitive material at a single position with an apparatus having a simple construction.

We claim:

1. A mechanism for cutting and transporting segments of material cut from an elongated web of material comprising:
   (i) means for supplying said material;
   (ii) means for feeding segments of said web of a predetermined length;
   (iii) cutter means for cutting said segments from said web into cut segments;
   (iv) a take-out section for receiving said cut segments of said web;
   (v) suction and transporting means for receiving said cut segments of said web supplied from said feeding means, said suction and transporting means being horizontally reciprocably mounted to be selectively reciprocal between a position adjacent said cutter means and a position adjacent said take-out section; and
   (vi) means for selectively reciprocating said suction and transporting means between said cutter means and said take-out section.

2. The cutting and transporting mechanism of claim 1, wherein said suction and transporting means comprises a platen having a plurality of holes formed therein; and means for providing a lowered pressure on a side of said platen opposite a side receiving said segments.

3. The cutting and transporting mechanism of claim 2, further comprising means for selectively horizontally reciprocating said platen.

4. The cutting and transporting mechanism of claim 3, wherein said material comprises photosensitive film, and further comprising means for exposing each said segment of said film between said feeding means and said take-out section.

5. The cutting and transporting mechanism of claim 1, wherein said feeding means comprises a roller and a guide engaged in a comb-like manner with said roller, said guide extending between said roller and said cutter means.

6. The cutting and transporting mechanism of claim 5, wherein said guide is movable vertically in synchronization with said cutter means.

7. The cutting and transporting mechanism of claim 6, wherein said guide is movable to a position higher than the surface of said plate during film feeding and to a position at the same level or lower than said surface of said plate when film is held by said suction and transporting means.

* * * * *